Feb. 8, 1938.   W. K. SIMPSON   2,107,551

STEAM TRAP AND BALANCED VALVE

Filed Dec. 16, 1935

Inventor
William K. Simpson
by Wright, Brown, Quinby & May
Attys.

Patented Feb. 8, 1938

2,107,551

UNITED STATES PATENT OFFICE 2,107,551

STEAM TRAP AND BALANCED VALVE

William K. Simpson, Waterbury, Conn., assignor to Hoffman Specialty Company, Waterbury, Conn., a corporation of Illinois Application December 16, 1935, Serial No. 54,618

10 Claims. (Cl. 236—53)

This invention relates to steam traps, particularly those which are required to pass relatively large quantities of water, and to outlet valves and pressure balancing means therefor, usable in such traps and particularly designed and intended for such use.

The objects of the invention are to provide in a steam trap a valve-controlled water passage of large area and of which the valve is balanced so that it may be operated by a small float; to provide, in operative combination with such a valve, means adapted to pass air through the trap without passing steam; and to provide improved, simple, inexpensive and durable means for effecting a desired balance (complete or partial) on opposite sides of a valve. The invention comprises not only the complete trap and valve combination with means suitable for accomplishment of the objects above stated, but also the sub-combination of valves and pressure balancing means therefor useful in the trap combination and in other environments where such a valve is useful; all as more fully set forth in the following specification and appended claims.

In the drawing showing illustrative embodiments of the invention,—

Like reference characters designate the same parts wherever they occur in all the figures.

Figure 1:
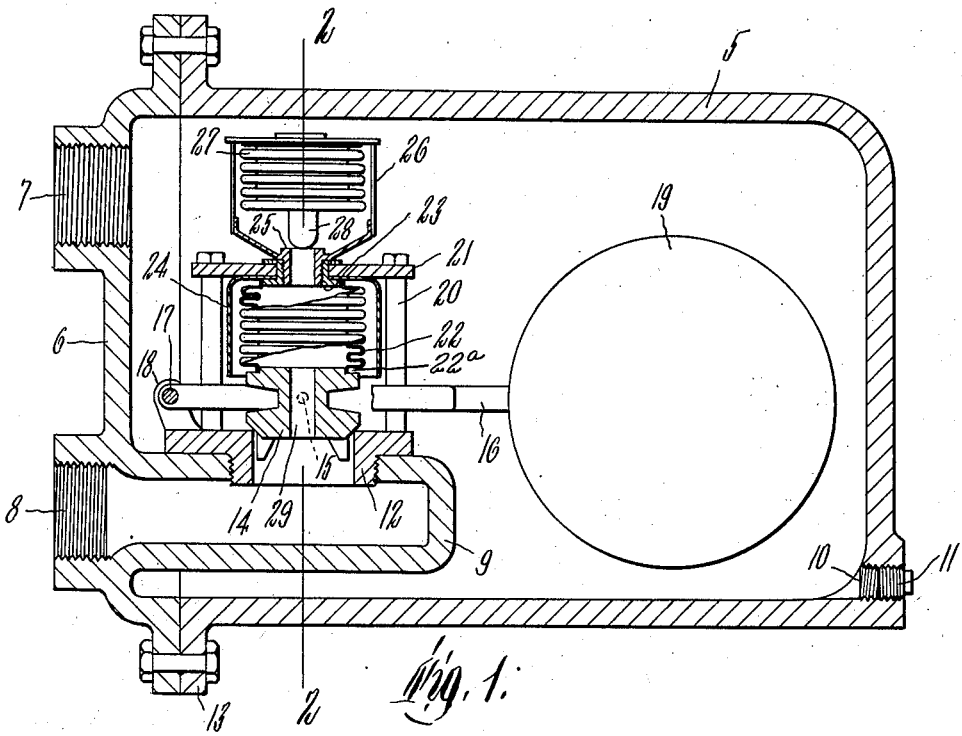
Fig. 1 is a vertical longitudinal section of a steam trap containing a balanced valve and air controlling thermostat in combination.

The casing of the trap here illustrated comprises a main body 5 having an opening at one end large enough for admission of the valve, its operating float and accessories, and a head 6 secured detachably by bolts to the open end of the main body, having in its upper part an inlet opening 7 and in its lower part an outlet opening 8, said openings being adapted for connection with pipes for conduction of fluids to and from the trap. A hollow extension 9 is formed on the inner side of the head, of which the interior communicates with the outlet opening and provides the only channel through which fluid may pass out of the trap in normal operation. There is, however, a drainage opening 10 at the bottom and rear end of the trap body which is normally closed by a plug 11 and permits discharge of the trap contents only when the plug is removed.

There is an opening in the upper side of the extension 9 in which is mounted a tubular valve seat fitting 12, the passage through which permits discharge of water and air from the trap. Except for this passage the extension 9 is closed to the trap interior.

The trap body 5 is preferably made as a metal casting with an outstanding flange 13 surrounding its open end, and the head is preferably made also as a metal casting, with the extension 9 an integral part thereof, and its margin formed to abut against the flange 13 of the body.

A valve 14 cooperates with the valve seat fitting 12 to open and close the passage therethrough, being arranged to seat against the outer orifice of said fitting; or it may be designed to cooperate with any other seat otherwise suitably arranged. This valve is coupled by a pivot pin 15 with the arms of a branched lever 16 which straddle the valve and are pivoted at 17 to lugs 18 on the valve seat fitting 12. A float 19 is secured to the single outer extremity of the branched lever and constitutes means for opening and closing the valve operated by rise and descent of the water level in the trap.

A yoke consisting of posts 20 rising from the valve seat fitting and a centrally apertured plate 21 secured to the upper ends of said posts holds the upper end of a bellows 22 of which the lower end is connected to the upper end of the valve. Such bellows is here shown as made of a length of integral corrugated metal tubing; but it may be made of an alternative equivalent construction, such as annular flat or dished diaphragms connected to one another in coaxial series at their outer and inner circumferences respectively, either directly or by intermediate rings or nipples. One end of the bellows is secured hermetically to the valve and the other end to a ring 23 made fast in the yoke plate 21. 24 represents a shield clamped to the yoke by ring 23 and surrounding the bellows to protect it from injury.

A valve seat fitting 25 is secured in the ring 23 and supports a cage or holder 26 by which a thermostat 27 is supported. Such thermostat is here shown as of the fluid expansion type consisting of bellows in which volatile liquid is contained. It typifies any heat responsive device changeable in dimensions or form in consequence of temperature changes. It carries a valve 28 arranged to cooperate with the seat fitting 25.

The opening within fitting 25 and a passage 29 through valve 14 into the interior of bellows 22 provide a channel through which air may pass from the upper part of the trap to the outlet, for the holder or cage 26 is of open construction permitting free flow past the valve 28 and thermostat when this valve is open. The passage 29 through valve 14 enables the fluid pressure existing in the outlet to be imposed on top of the valve when the thermostatic valve is closed. According as the area enclosed by bellows 22 is equal to, or larger or smaller than the area in the passage closed by valve 14 (which may be called the main valve), the pressures acting on this valve when the thermostatic valve is closed, are exactly balanced or overbalanced or partially balanced. With equal areas enclosed by the bellows and the valve fitting respectively, no necessity exists for exerting power to overcome any differential pressure in opening or closing the valve. The only operating power then required is that necessary to overcome frictional resistance and metal tension in the bellows. Hence the valve may be operated by a relatively small float connected to a relatively short arm, while the outlet controlled by the valve may be of relatively very large dimensions. A trap of large capacity may be made with exceptionally small external dimensions. When greater sensitivity is required the valve area enclosed by the bellows is made smaller than the opposite area in the desired degree, thus balancing more or less the spring tension in the bellows. Conversely, a tighter closing effect is obtainable by increasing the valve disk area within the bellows.

The pressures in the trap external to the bellows, and acting on the valve and bellows when the thermostatic valve is closed, are also balanced. Such external pressure acts oppositely on the bellows and valve respectively in the space shown at 22a. Essentially the same effect occurs in any valve and bellows combination where the bottom of the bellows presents an external surface opposite to the upper surface of the valve, whatever may be the specific dimensions of such surface areas. And all pressures acting on the opposite walls of the bellows corrugations, both internally and externally, balance one another.

Figures 2, 3:
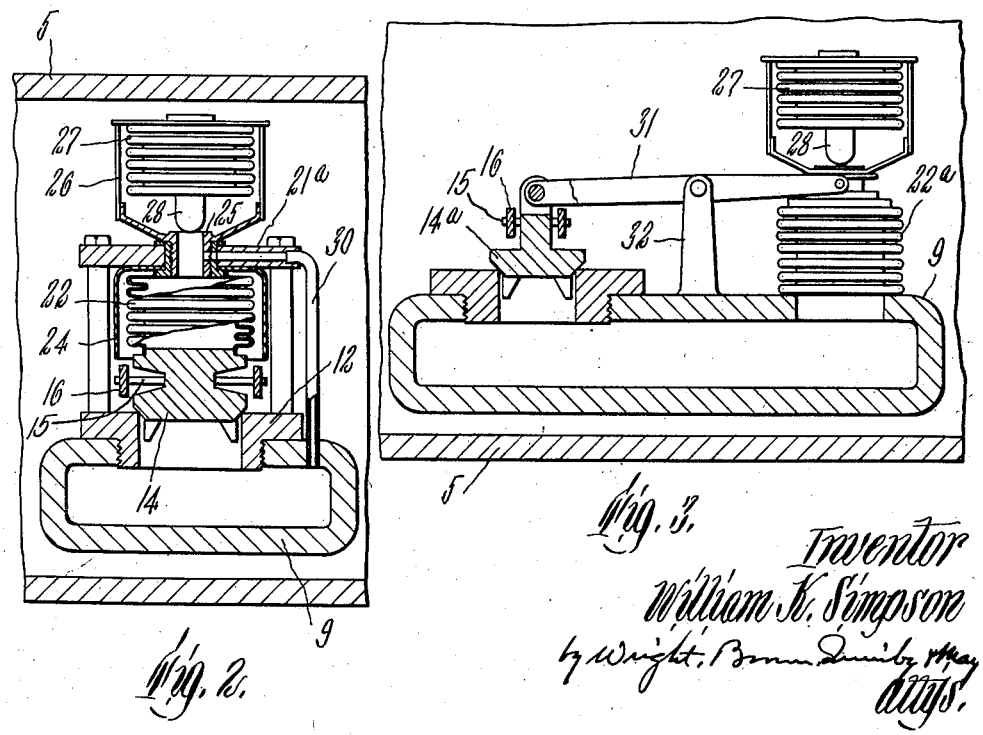
Fig. 2 is substantially a cross section on line 2—2 of Fig. 1, but modified in detail to show an equivalent variation in means for balancing the pressures acting on the valve.
Fig. 3 is a view similar to Fig. 2 showing still another modification.

The pressure connection between the interior of the bellows and the outlet may be external instead of through the valve itself. Such a variation is shown in Fig. 2, where a tube 30 leads from the extension 9 of the outlet connection to the interior of the bellows through a passage in the cross member 21a of the supporting yoke. Except for this variation, Fig. 2 represents the construction of Fig. 1 as seen in cross section.

Another variation is shown in Fig. 3, where the balancing pressure is exerted indirectly on the valve through an intermediate lever. The bellows 22a in this case is open to the interior of the outlet extension 9 and is connected to one arm of a lever 31 pivoted to a bracket 32 on the extension, and the other arm of which is pivoted to the valve 14a. An exact pressure balance on the valve may be obtained with unequal areas of bellows enclosure and valve-controlled outlet by mounting the lever so that its arms are inversely proportional to the respective areas through which pressures are applied to them. The thermostatic valve and its operating thermostat are carried by the bellows in this case, instead of being supported by a rigid structure as in the cases previously described.

In any case the pressure areas may be designed to produce a greater or less counterbalancing effect to the weight of the valve operating arm.

When a trap like or equivalent to any of the combinations thus described is connected to a steam system in which air may exist at times, it is empty of steam whenever the end of the system which is connected to the trap contains air. Upon steam being turned into such a system, the air first flows past the open thermostatic valve and through the bellows (or the bypassage of Fig. 2), to the outlet; and when steam enters the trap the thermostatic valve closes. Thereafter water of condensation accumulates to a height sufficient to open the main valve, and then flows from the outlet. Not only does the balancing means diminish the force needed to operate the valve, but it also causes the water level in the trap to remain substantially constant and causes the discharge to be substantially or nearly continuous. Wherever the trap is applied, the thermostatic valve remains closed whenever and for as long as steam enters the trap.

Conditions may arise when water will flow into the trap faster than it can be discharged between the raised main valve and its seat. In such conditions the thermostatic valve and passage 29 through the main valve provide an auxiliary passage capable of discharging a considerable additional quantity of water. The excess water, rising in the trap until it contacts with the thermostat, and being at a lower temperature than that at which the thermostatic valve is designed to close, causes that valve to be opened, and flows past it. Even if the water accumulation is not deep enough to submerge the thermostat, yet if the volume of water flowing through the inlet is large in proportion to the steam entering at the same time, the water temperature may be low enough to open the thermostatic valve or prevent its closing.

The principles of valve balancing means and combination of a bellows with a valve to effect pressure balance on the valve, herein disclosed, may be used in other situations than in steam traps; i. e., in water feeders and similar devices; and the valve may be operated by other means than a float, within the scope of protection which I claim.

What I claim and desire to secure by Letters Patent is:

1. A steam trap comprising a body having a passage to the exterior and a valve seat surrounding a part of such passage, a valve cooperating with said seat, a valve-operating float coupled with the valve, a bellows supported at one end in fixed location in the trap having fluid pressure communication in its interior with the outlet passage and being also in flow communication with the interior of the trap, and a thermostatic valve organized to open and close the latter communication under different temperature conditions, the movable part of the bellows being in hermetically sealed connection with the valve whereby to apply the fluid pressure existing at the trap outlet upon the opposite side of the valve from that exposed to the outlet.

2. A steam trap comprising a hollow body having inlet and outlet passages and being otherwise enclosed, a valve arranged to seat across one of said passages and being exposed at one side to the fluid pressure external to the trap, a bellows mounted in the trap and being in interior communication with the same external pressure while exposed on its exterior to the pressure within the trap, said bellows being in such connection with the valve as to cause its internal pressure to be exerted on the valve in opposition to the external pressure to which the valve is exposed, and means for opening and closing the valve.

3. A steam trap as set forth in claim 2 including further a communication between the interior of the bellows and the interior of the trap, and a thermostatic valve arranged to open and close said trap communication under different temperature conditions.

4. A steam trap comprising a hollow body having a head and an extension from the head into the interior of the body, said extension having a valve seat fitting in its upper side but being otherwise closed to the interior, while open to the exterior, of the trap, a valve cooperating with said fitting to open and close the passage through it, means for shifting the valve between closed and open positions, a bellows so connected with the valve that the valve constitutes the movable end wall of the bellows, stationary supporting means in the trap to which the opposite end of the bellows is secured, the interior of the bellows being in communication both with the interior of said extension and with the interior of the trap, a valve for opening and closing the communication with the trap interior and a thermostat for operating the last named valve constructed and organized to close said valve under usual operating conditions of the trap.

5. The combination with a casing having an opening to the outside, of a valve controlling said opening and being exposed on one side to the fluid pressure outside of the casing, an expansible bellows mounted in the casing in internal communication with the external pressure and in exposure externally to the pressure within the casing means whereby the internal pressure acting on the bellows is applied to the valve in opposition to the external pressure to which the valve is exposed, and means for shifting the valve between closing and opening positions.

6. The combination with a casing having an opening to the outside of a valve controlling said opening and being exposed on one side to the fluid pressure outside of the casing, an expansible bellows mounted in the casing in internal communication with the external pressure and in exposure externally to the pressure within the casing, the bellows being fixed in position at one end and movable at the opposite end under forces of expansion and contraction, a lever having, one arm connected to the movable end of the bellows and a second arm connected to the valve and arranged to apply the bellows pressure to the valve in opposition to the external pressure to which the valve is exposed, and means for shifting the valve between opening and closing positions.

7. A casing having an opening to the outside, a valve overlying said opening, operating means for displacing the valve so as to uncover and close respectively the opening, and a bellows connected at one end to the valve, the other end of the bellows being mounted stationary in the casing, and the interior of the bellows being normally closed to the pressure within the casing but exposed to the external pressure, while its exterior is exposed to the pressure within the casing.

8. A casing having an external opening, a valve arranged to open and close said opening, operating means for displacing the valve between positions in which it respectively prevents and permits flow through the opening, a bellows rigidly mounted in the casing and in hermetically sealed connection with the valve, being exposed externally to the pressure within the casing and in communication internally with said external opening, the bellows having an opening in communication with the interior of the casing, and a thermostatically operated valve arranged in relation to the last named opening to close and open it in consequence of temperature changes within the casing.

9. A steam trap comprising a casing having an outlet, a rigid supporting structure spaced apart from said outlet, a bellows secured to said structure between the latter and the outlet, a valve connected hermetically with the bellows between the latter and the outlet in position to seat across the outlet, and a float in the casing connected with the valve so as to open and close the latter with rise and descent respectively of water in the casing, the bellows being exposed externally to the pressure within the casing and in internal communication with the outlet.

10. In a steam trap, the combination with a casing having an inlet and an outlet, a float-operated valve controlling the outlet, a bellows in hermetic union with the valve inside of the casing, surrounding an area of the valve substantially equal to the area of the outlet and at the opposite side of the valve from the outlet, a rigid support to which the end of the bellows opposite to the valve is secured, there being an opening into the bellows through said support and a pressure transmitting communication from the interior of the bellows to said outlet, and a thermally controlled valve in the casing arranged to open and close the opening between the bellows and the interior of the casing.

WILLIAM K. SIMPSON.